(12) United States Patent
Hendey

(10) Patent No.: US 6,748,802 B1
(45) Date of Patent: Jun. 15, 2004

(54) UNIVERSAL MOUNTING BRACKET FOR COUPLING A WATER METER TO A DATA LOGGER

(76) Inventor: Arthur A. Hendey, P.O. Box 529, Beaumont, CA (US) 92223

( * ) Notice: Subject to any disclaimer, the term of this patent is extended or adjusted under 35 U.S.C. 154(b) by 0 days.

(21) Appl. No.: 10/369,393

(22) Filed: Feb. 20, 2003

(51) Int. Cl.⁷ ................................................. G01F 3/20
(52) U.S. Cl. ................................................... 73/272 R
(58) Field of Search ............................... 248/7; 73/861, 73/272 R

(56) References Cited

U.S. PATENT DOCUMENTS

| | | | | |
|---|---|---|---|---|
| 4,654,662 A | * | 3/1987 | Van Orsdel | 340/870.03 |
| 4,986,096 A | * | 1/1991 | Soehner et al. | 248/553 |
| 4,993,670 A | * | 2/1991 | Tesar | 248/68.1 |
| 6,067,917 A | * | 5/2000 | Nimberger et al. | 111/119 |
| 6,118,269 A | * | 9/2000 | Davis | 324/110 |
| 6,378,817 B1 | * | 4/2002 | Bublitz et al. | 248/200 |
| 6,386,029 B1 | * | 5/2002 | Katzman et al. | 73/273 |

* cited by examiner

Primary Examiner—Harshad Patel
(74) Attorney, Agent, or Firm—Morland C. Fischer

(57) ABSTRACT

A universal mounting bracket by which any one of a variety of conventional water meters for measuring the volume of water consumed by a user is mechanically coupled in close proximity to a conventional data logger that is adapted to transmit a signal to a remote receiver which is indicative of the volume of water consumption measured by the water meter. The universal mounting bracket has a flat base that is connected to the bottom of the water meter and a flat face that is connected flush against a side of the data logger, whereby the water meter and data logger lie in spaced side-by-side alignment with one another. A pair of threaded bolts extend through respective bolt holes in the flat base of the universal mounting bracket for receipt at correspondingly threaded receptacles formed in the bottom of the water meter. One of the bolt holes has an elongate configuration to receive a bolt therethrough at different positions therelong depending upon the size of the water meter and/or the location of the threaded receptacles formed in the bottom of the water meter.

4 Claims, 2 Drawing Sheets

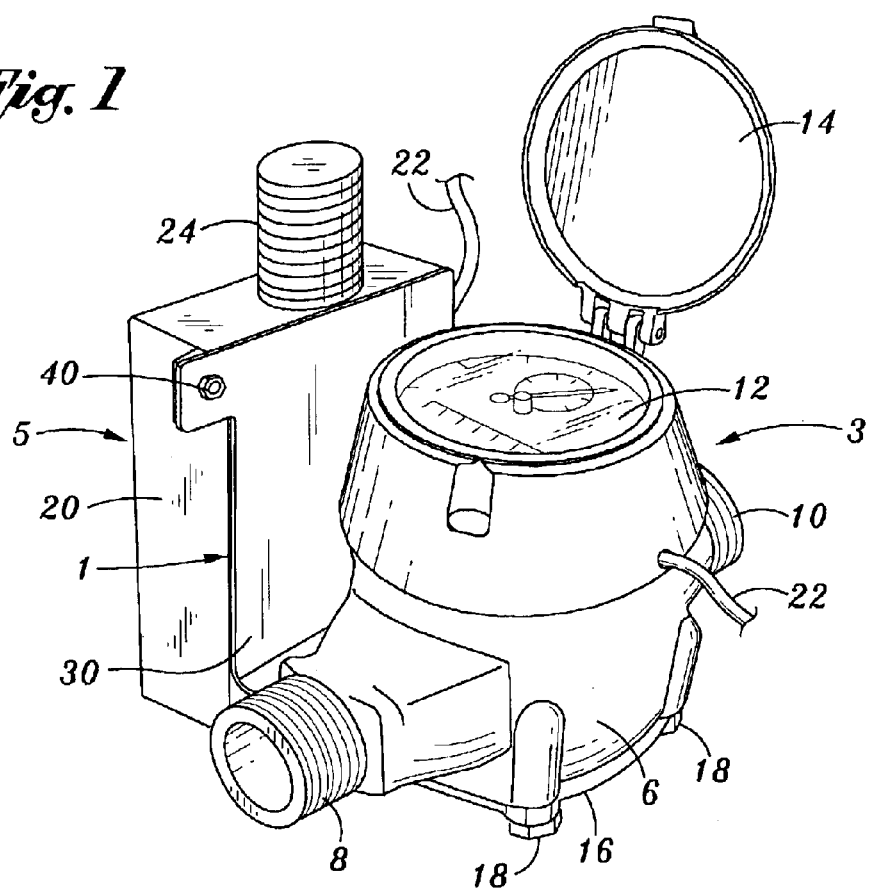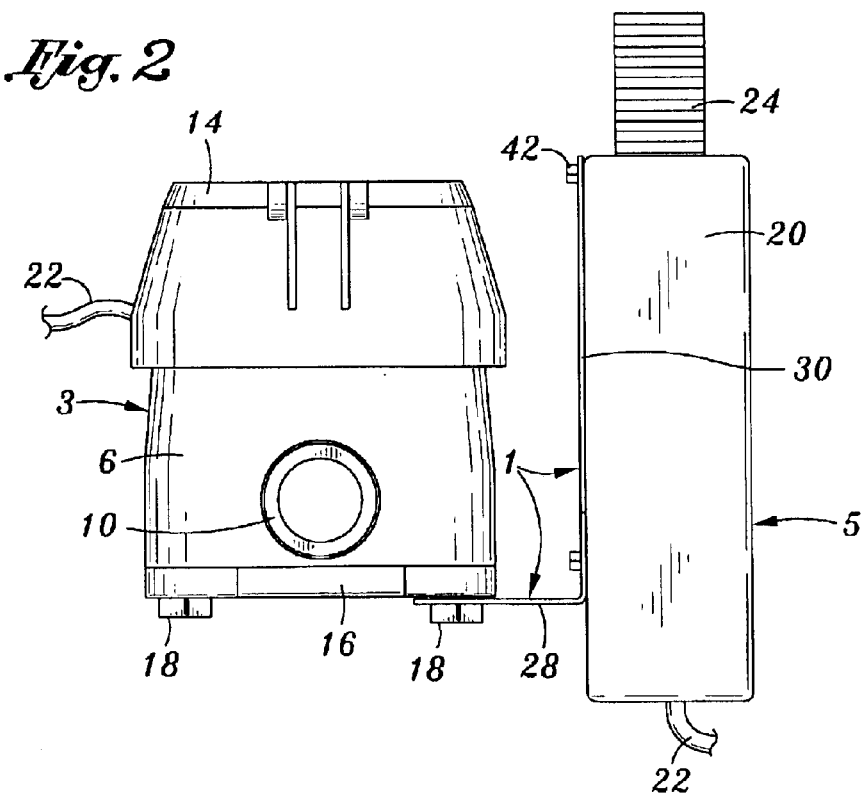

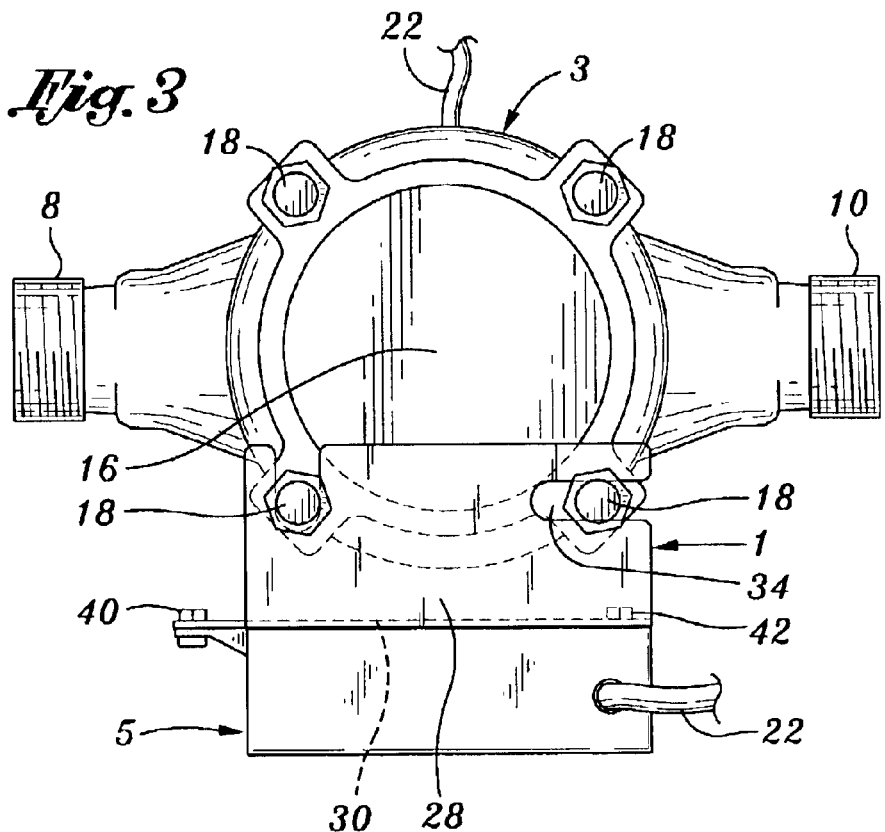
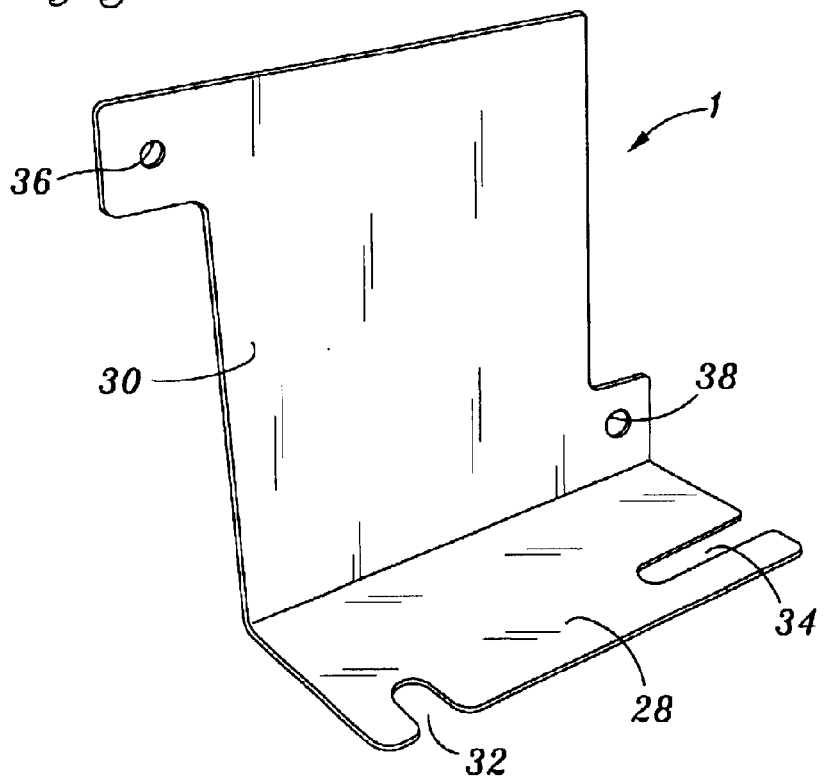

UNIVERSAL MOUNTING BRACKET FOR COUPLING A WATER METER TO A DATA LOGGER

BACKGROUND OF THE INVENTION

1. Field of the Invention

This invention relates to a universal mounting bracket by which any one of a variety of water meters for measuring the volume of water consumed by a user is mechanically coupled in close proximity to a data logger that is adapted to transmit a signal to a remote receiver which is indicative of the volume of water measured by the water meter. By virtue of the foregoing, the water meter and the data logger will be held in spaced side-by-side alignment with one another to avoid blocking or interfering with the signal being transmitted by the antenna of the data logger.

2. Background Art

Water meters have long been used to measure the volume of water delivered from a municipal source and consumed by residential, commercial and government agency users. In most cases, the water meter must be read and the readings recorded by an individual so as to provide an accounting of the water consumed by the user. In other cases, the indication of water consumption measured by the water meter can be transmitted by means of a signal that is emitted by a transmitter that is associated with the water meter for receipt at a remote receiver. By way of particular example, a data logger has been employed to transmit information that is indicative of the volume of water delivered to a user and measured by the water meter. The data logger includes an antenna for transmitting a corresponding radio frequency signal to the remote receiver so that information can be collected and recorded automatically without the intervention of meter reading personnel.

In this same regard, no means has heretofore been provided for coupling the data logger to the water meter in order to hold the data logger and water meter in close proximity to one another so as to minimize the run of electrical wiring therebetween and assure that the antenna of the data logger is properly positioned so as to be able to transmit an unimpeded signal to the remote receiver. That is to say, it has been common to tie the data logger to a plastic (e.g. PVC) stake which is planted in the ground near the water meter. In time, the ground has been known to erode whereby the stake will fall and the data logger that is tied thereto is laid against the ground. Consequently, the antenna of the data logger may become misaligned with the receiver or otherwise aimed towards an obstruction, whereby the signal transmitted between the antenna of the data logger and the remote receiver is susceptible to interference or blockage. It is also common to simply toss the data logger inside an enclosure in which the water meter is located to prevent tampering. The data logger within this enclosure is therefore randomly positioned such that the antenna thereof is often oriented so as to be out of alignment with the remote receiver with the possibility of causing the signal and the corresponding information transmitted from the antenna to be blocked or suffer interference.

SUMMARY OF THE INVENTION

In general terms, a universal mounting bracket is disclosed by which any one of a variety of water meters for measuring the volume of water consumed by a residential, commercial or government agency user is mechanically coupled in close proximity to a data logger having an antenna from which a signal that is indicative of the volume of water measured by the water meter is transmitted to a remote receiver. Accordingly, the data logger will be held and spaced side-by-sided alignment with the water meter to prevent the position of the data logger from changing in order to advantageously preserve the initial alignment between the antenna of the data logger and the remote receiver to avoid signal blockage or interference.

The universal mounting bracket is preferably manufactured from metal and includes a flat base to be connected to the bottom of the water meter and a flat face to be connected to a side of the data logger, whereby the data logger is held in close proximity to the water meter to minimize the run of electrical wiring that extends therebetween. The flat base and face of the mounting bracket are coextensively connected and perpendicularly aligned relative to one another. A pair of bolt holes are formed in each of the base and face of the mounting bracket to receive respective bolts therethrough for connecting the mounting bracket between the water meter and the data logger. However, one of the bolt holes formed in the base of the mounting bracket has an elongated configuration so as to receive a bolt at different positions therealong depending upon the particular size of water meter to which the mounting bracket is to be connected and/or the location of a corresponding receptacle at the bottom of the water meter within which the bolt is to be located.

BRIEF DESCRIPTION OF THE DRAWINGS

FIG. 1 is a perspective view showing the assembly of a water meter coupled in close proximity to a data logger by means of the universal mounting bracket of this invention;

FIG. 2 is a side view of the assembly of FIG. 1 showing the universal mounting bracket holding the water meter and the data logger in side-by-side spaced alignment with one another;

FIG. 3 is a bottom view of the assembly of FIG. 1; and

FIG. 4 is a perspective view of the universal mounting bracket of FIG. 1 disconnected from the water meter and data logger.

DETAILED DESCRIPTION

A universal mounting bracket 1 for mechanically coupling a water meter 3 in close proximity to a data logger 5 is initially described while referring concurrently to FIGS. 1–3 of the drawings. The water meter 3 is a conventional device commonly employed by residential, commercial or government agency users to measure the volume of water consumed thereby.

Briefly, water meter 3 includes a hollow body 6, threaded inlet and outlet ports 8 and 10 to be connected to deliver a supply of water from a source thereof to the user, and an analog register 12 to provide a visual indication of the volume of water consumed by the user. A cap 14 is pivotally connected to the body 6 in order to be rotateable between open and closed positions relative to register 12. A removable bottom plate 16 is detachably connected across the bottom of the hollow body 6 of water meter 1 by means of bolts 18. Access to a flow responsive turbine assembly (not shown) at the interior of the hollow body 6 is available by first removing bolts 18 and then detaching bottom plate 16 from the body 6.

The data logger 5 is also a conventional device that is adapted to transmit information collected by the water meter 3 to a complementary receiving unit that is remotely located with respect to data logger 5. One commercially available data logger 5 that is suitable to be coupled to the water meter 3 to transmit the information collected thereby is that manufactured by Datamatic Corporation of Texas. Briefly, the data logger 5 is a battery powered device that includes a housing 20 containing electrical sensing circuitry to be interfaced with the water meter 3 by way of a wire 22. The electrical sensing circuitry of data logger 5 receives a signal which is indicative of the rotation of the turbine assembly of water meter 3 in response to the flow of water through the hollow body 6 thereof to the user. Data logger 5 also includes an antenna 24 whereby to function as a radio transmitter by which to send information concerning the water consumption of the user to the remote receiver.

As will now be disclosed, the universal mounting bracket 1 enables the water meter 3 to be coupled in close proximity to the data logger 5 so that the length of electrical wire 22 which extends therebetween will be relatively short and the antenna 24 of data logger 5 can be maintained in alignment with the remote receiver so that radio frequency signals containing information regarding the water consumption of the user can be transmitted from the data logger 5 to the receiver without interruption or interference.

More particularly, and referring now to FIGS. 1–4 of the drawings, the universal mounting bracket 1 is preferably manufactured from metal. Mounting bracket 1 includes a flat base 28 and a flat face 30 coextensively connected to and standing upwardly from one end of the base 28 so as to lie in perpendicular alignment therewith. The base 28 of mounting bracket 1 includes a pair of bolt holes 32 and 34 (best shown in FIG. 4). As an important detail, one of the bolt holes 34 through base 28 is elongated to receive a bolt therethrough at a variety of different positions therealong. The face 30 of mounting bracket 1 also includes a pair of bolt holes 36 and 38 for a purpose that will now be described.

In the assembled combination shown in FIGS. 1–3, the flat face 30 of the universal mounting bracket 1 is laid flush against one side of the housing 20 of data logger 5. A pair of threaded bolts 40 and 42 are moved through respective bolt holes 36 and 38 in the face 30 of mounting bracket 1 and into receipt by correspondingly threaded receptacles that are formed in the adjacent side of data logger 5, whereby mounting bracket 1 and data logger 5 are connected face-to-face with one another. In this same regard, the water meter 1 is seated upon the flat base 28 of mounting bracket 1. A pair of the previously described bolts 18 for connecting the bottom plate 16 to water meter 1 are first moved through respective bolt holes 32 and 34 in the flat base 28 of mounting bracket 1, through corresponding bolt holes formed in the bottom plate 16 of water meter 3, and into receipt by threaded receptacles formed in the bottom of the body 6 of water meter 3, whereby the water meter 3 and the flat base 28 of mounting bracket 1 are connected one above the other.

By virtue of the elongated bolt hole 34 in the flat base 28 of universal mounting bracket 1, different water meters can be easily and conveniently connected atop base plate 28. That is to say, a bolt 18 may be inserted at any position along the elongated bolt hole 34 on an as-needed basis, depending upon the size of the water meter and/or the location of the corresponding holes through the bottom plate 16 and the threaded receptacles at the bottom of the water meter 3. Moreover, the water meter 3 will be securely and fixedly attached to the data logger 5, whereby data logger 5 is held in an upright stance adjacent the water meter to preserve the position thereof and prevent an interference with or blockage of the signals being transmitted from the antenna 24. What is even more, universal mounting bracket 1 assures that the water meter 3 and data logger 5 will be reliably coupled to one another in a compact, side-by-side configuration which may be necessary in situation where space is limited.

I claim:

1. In combination:

a meter for measuring a physical parameter;

a data logger responsive to the physical parameter measured by said meter, said data logger having an antenna by which to transmit a signal that is indicative of the physical parameter measured by said meter;

an L-shaped mounting bracket extending between said meter and said data logger by which said meter and said data logger are connected together in close proximity to one another, said L-shaped mounting bracket comprising a base and a face that are arranged in perpendicular alignment with one another, the base of said L-shaped mounting bracket connected to said meter and the face of said L-shaped mounting bracket connected to said data logger; and a pair of fasteners, a first of said pair of fasteners connecting the base of said L-shaped mounting bracket to said meter and the second of said pair of fasteners connecting the face of said L-shaped mounting bracket to said data logger.

2. The combination recited in claim 1, wherein said meter connected to the base of said L-shaped mounting bracket and the data logger connected to the face of said L-shaped mounting bracket are held side-by-side one another.

3. The combination recited in claim 1, wherein said meter is seated upon the base of said L-shaped mounting bracket.

4. The combination recited in claim 1, wherein the base of said L-shaped mounting bracket has a hole formed therein for receiving the first of said pair of fasteners therethrough, said hole having an elongated configuration for receiving said first fastener at different positions therelong.

\* \* \* \* \*